Figure 3:
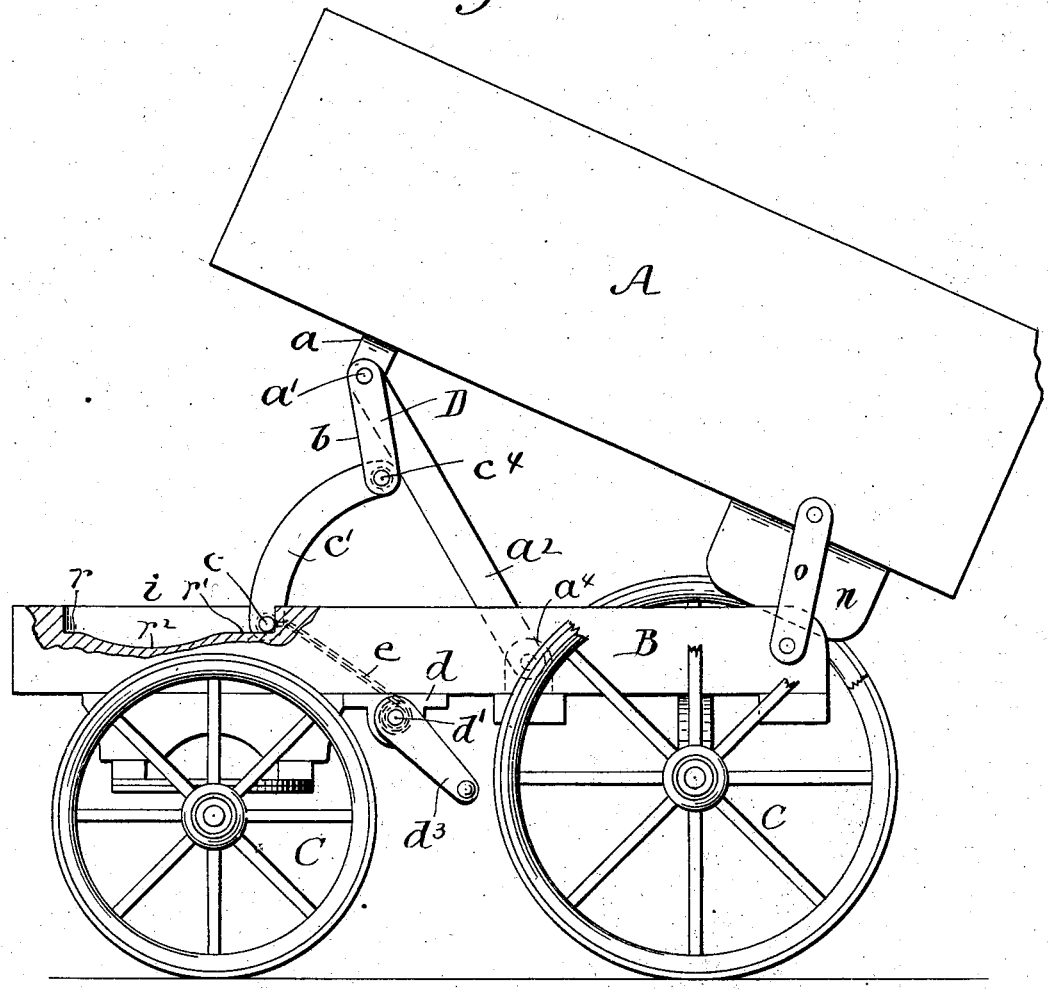

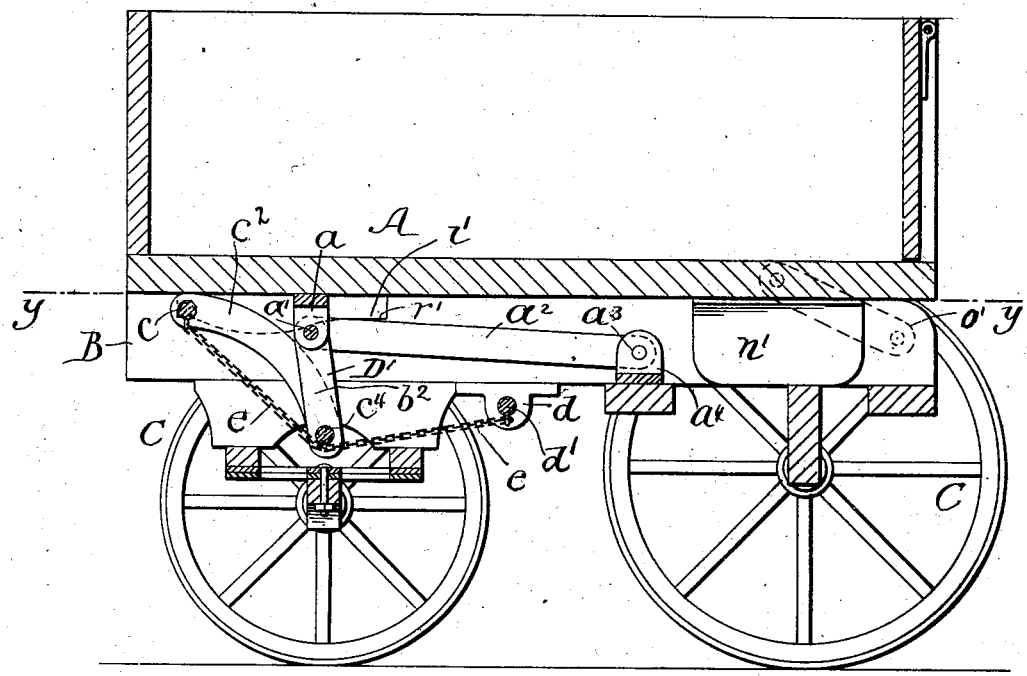
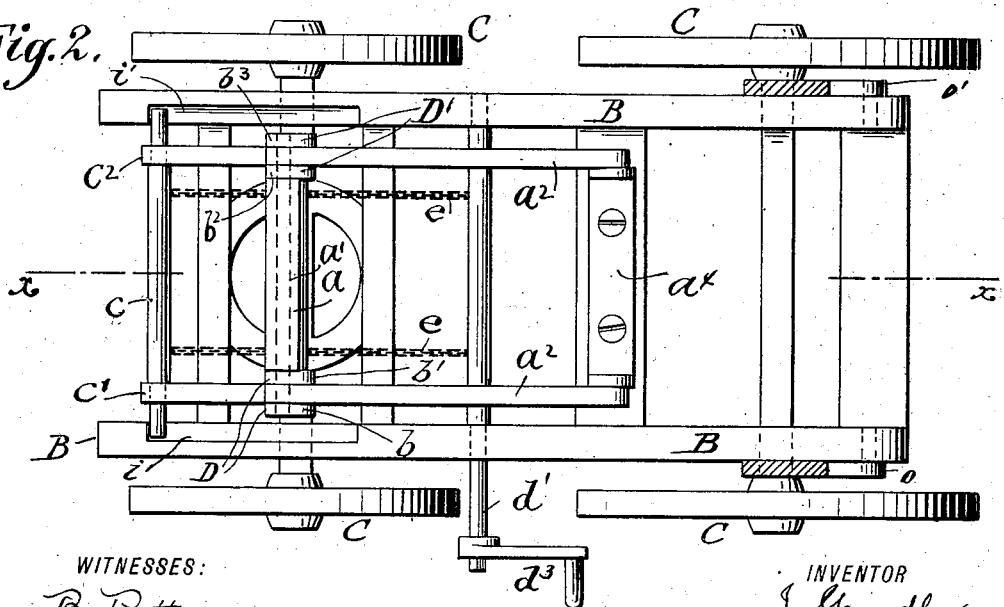

No. 726,051. PATENTED APR. 21, 1903.
J. GRUNDLER.
DUMPING MECHANISM FOR WAGONS.
APPLICATION FILED DEC. 10, 1902.
NO MODEL. 2 SHEETS—SHEET 2.

WITNESSES:
B. Patterson

INVENTOR
J. Grundler
BY
Clark Dumont
ATTORNEYS

UNITED STATES PATENT OFFICE.

JOSEPH GRUNDLER, OF JERSEY CITY, NEW JERSEY.

DUMPING MECHANISM FOR WAGONS.

SPECIFICATION forming part of Letters Patent No. 726,051, dated April 21, 1903.

Application filed December 10, 1902. Serial No. 134,628. (No model.)

*To all whom it may concern:*

Be it known that I, JOSEPH GRUNDLER, a citizen of the United States, and a resident of Jersey City, county of Hudson, and State of New Jersey, have invented certain new and useful Improvements in Dumping Mechanism for Wagons, of which the following is a specification, reference being had to the accompanying drawings, forming a part thereof, in which similar letters of reference indicate corresponding parts.

This invention relates to improvements in dumping mechanism for wagons.

The invention has for its object to produce an easy-working, inexpensive, simple, and effective mechanism whereby a wagon may be quickly dumped by a single operator.

The invention has also for its object the production of a system of linkwork which, operating with a revoluble shaft and proper connections, will by giving the operator the advantage of leverage enable him quickly and easily to lift the front end of a wagon-bed for dumping the same.

The invention also has for its object divers other novel features hereinafter more fully set forth.

The invention consists in the combination and arrangement of divers levers attached to the bed and running-gears of a wagon and operating in connection with a revoluble shaft, and a chain connecting said shaft and said system of levers, so as to enable an operator to lift the said bed into proper position to be dumped.

The nature of the invention also consists in the combination and arrangement of a system of levers interposed between the bed and the running-gears of a wagon, attached to both, attached together by shafts, carrying a rod which slides in notches in the side rails of said running-gears, a revoluble shaft and a winch, and a chain connecting said revoluble shaft and said system of levers, so that by turning said revoluble shaft the operator can readily raise said wagon-bed into a position to be easily dumped.

The invention also consists in divers other novel features, which will be fully understood from the following general description and the annexed drawings and will be subsequently pointed out in the claims.

In the accompanying drawings, which are hereby made a part of this specification, Figure 1 is a vertical sectional view of a wagon embodying my invention, taken on the line $x\ x$ of Fig. 2. Fig. 2 is a sectional plan view of the same, taken on the line $y\ y$ of Fig. 1. Fig. 3 is a side view in elevation of a wagon embodying my invention with the bed in proper position for dumping and with a part broken away to better display the mechanism.

In the accompanying drawings, A designates the bed of a wagon, B the side rails of the running-gears, and C the wheels. To the bottom of the bed is attached a bracket $a$. This bracket consists of two horizontal ears joined together by a bottom plate integral with them and standing at right angles to them. In this bracket is journaled the shaft $a'$. Upon this shaft are pivotally mounted by one end of each the double links D and D'. These links consist each of two pieces, (designated, respectively, as $b\ b'$ and $b^2\ b^3$,) which are short strips of flat metal of equal length and formed with registering eyes at each end. These links are mounted on shaft $a'$ outside of the bracket $a$ and a little apart, so as to accommodate other parts of the mechanism. Upon a cross-bar of the running-gears is fastened the bracket $a^4$, similar in its construction to the bracket $a$.

$a^2\ a^2$ designate two levers. These are pivoted by one end at $a^3$ to the bracket $a^4$ and mounted pivotally by the other end on the shaft $a'$, each between two parts of the links D and D'. This is the upper end of the two links.

$c'\ c^2$ designate two bent levers pivoted by one end to the lower ends of the links D and D' by the shaft $c^4$ passing through their ends and through the lower ends of the links. The arrangement is such that one end of each lever comes between the two parts of one of the links.

$c$ designates a rod which passes through the outer ends of the levers $c'\ c^2$ and extending outside of them, as illustrated in Fig. 2, slides in the notches $i$ and $i'$, formed in the side rails B B. These notches are cut in the upper inside corners of the side rails. Their sides and ends are plane perpendicular surfaces. The bottoms are formed with plane horizontal surfaces at $r$ and $r'$; but at $r^2$ this surface is concave, as illustrated. In these notches move the ends of the rod $c$.

$d$ designates bearings in the running-gears, in which is journaled the shaft $d'$, turned by the crank $d^3$. Between this shaft $d'$ and the rod $c$ extend the chains $e$, which are arranged to wind on said shaft and draw the rod $c$ in the notches $i$ $i'$ toward the said shaft $d'$. If it be desired, the shaft $d'$ may be equipped with a ratchet-wheel and pawl to control its backward motion.

$n$ and $n'$ are guide-plates which are fastened to the bottom of the bed A near its rear end and bearing on the inside surfaces of the side rails B B prevent lateral displacement of the rear end of the bed.

$o$ and $o'$ are straps of metal connecting the rear ends of the bed and the running-gears to prevent the bed from slipping too far rearward when it is raised to be dumped. These straps, however, are not necessary to the successful operation of the device and may in some cases be omitted, if it be found desirable.

In the operation of my invention at first the bed which has been previously filled is in the position illustrated in Fig. 1, lying horizontally on the running-gears. Then the rod $c$ will be resting on the horizontal surfaces $r$ of the notches $i$ $i'$. When the operator begins to turn the shaft $d'$ by means of the crank $d^3$ and wind the chains $e$ upon the shaft, at first the rod $c$, bearing in the notches $i$ $i'$, will act as a fulcrum as the chains begin to raise the links D D'. As long as it acts as a fulcrum it will remain on the horizontal surface; but when the chains have lifted the links a little the motion of the levers $a^2$ will draw the rod off the horizontal surface onto the concave surface. Then until the bottom of the concave surface is reached by the rod the concavity will assist the operator in raising the bed. When the bottom of the concavity has been reached by the rod, the parts will be in such a position as to give the operator full advantage of the leverage, so that he can easily raise the bed to its full height, drawing up the rod onto the horizontal surface $r'$. The rod will not be apt to slip on this surface, and so the bed will be held steadily in position for dumping by the joint action of the levers and the rod $c$ and the chains $e$. When the bed is empty and the chains released, a slight jar will cause the bed to sink down into its horizontal position on the running-gears and restore the mechanism to its normal position. In the meantime the guide-plates $n$ and $n'$ prevent lateral displacement of the rear end of the bed, and the strips $o$ $o'$ limit the rearward slip of the bed; but if for any reason a longer slip endwise than these strips $o$ $o'$ will allow should be desired they may be removed and then the bed will slip rearward as far as the said lifting mechanism will allow and will when lowered be returned to its normal position on the running-gears by the action of the said lifting mechanism.

Aside from what is herein disclosed a wagon to which my device is applied is used in the common and well-known way. I do not, however, limit myself strictly to the construction and arrangement herein set forth, as it is obvious that under the spirit and scope of my invention I am entitled to slight variations of construction and arrangement.

Having now described what my invention is, how it is constructed, and how it is used, what I claim as my invention, and desire to secure by Letters Patent, is—

1. The combination with the bed and running-gears of a wagon, a revoluble shaft journaled in the side rails of said running-gears, and means for turning said shaft, of a bracket upon the bottom of said bed, a second shaft journaled in said bracket, links mounted each by one end on said second shaft, a third shaft passing through the other ends of said links, levers mounted by one end upon said third shaft, a rod passing through the other ends of said levers and bearing on the side rails of said running-gears, a bracket secured to said running-gears, levers pivotally mounted by one end on the last-named bracket, and extending within their other ends to the said second shaft on which they are pivotally mounted and flexible connections attaching said rod to said first-named revoluble shaft.

2. The combination with the bed and running-gears of a wagon, a bracket upon the bottom of said bed, comprising two parallel ears and a bottom plate integral with said ears and standing at right angles thereto, and a bracket of similar construction upon the said running-gears, of a second shaft journaled in said first-named bracket, two double links pivotally mounted by their upper ends upon said second shaft, a third shaft passing through the lower ends of both said links, levers pivotally mounted by one end upon said third shaft, a rod passing through the other ends of said levers, and bearing on the side rails of said running-gears, levers pivotally mounted by one end on the bracket upon said running-gears, and extending with their other ends to the said third shaft on which they are pivotally mounted by their other ends between the upper ends of said links, and flexible connections attaching said rod to said first-named revoluble shaft.

3. The combination with the bed and running-gears of a wagon, a bracket upon the bottom of said bed, a bracket upon said running-gears, a revoluble shaft mounted on the side rails of said running-gears, and means for turning said shaft, of a second shaft journaled in said first-named bracket, double links comprising each two short strips of metal of equal length, parallel to each other pivotally mounted by their upper ends upon said second shaft, third shaft passing through the lower ends of both said links, levers pivotally mounted by one end upon the said third shaft, between the lower ends of said links, a rod passing through the other ends of said levers, and movably resting upon the side rails of said running-gears, levers pivoted by one end to the bracket on said running-gears, extending with their other ends to the said second shaft in said first-named bracket, and pivotally mounted on such shaft between the upper ends of said links, and a chain connecting said rod and said first-named revoluble shaft.

4. The combination with the bed and running-gears of a wagon, a bracket upon the bottom of said bed, a revoluble shaft mounted on the side rails of said running-gears, and a crank for turning said shaft, of a second shaft mounted in said bracket, links pivotally mounted by their upper ends on said second shaft, a third shaft passing through the lower ends of said links, bent levers pivoted by one end on said third shaft, a rod passing through the other ends of said levers, and resting with its ends in a notch cut in the side rails of said running-gears, said notch being formed as to its bottom with two horizontal ends, and a concave middle part, and mechanism for connecting said first-named shaft with said rod, and sliding said rod in said notch.

5. The combination with the bed and running-gears of a wagon, of bent levers, carrying at one end a transversely-arranged rod sliding in notches cut in said running-gears, said notches having plane perpendicular sides and ends, and a bottom formed with two plane horizontal surfaces, one at each end, and a concave surface in the middle, and mechanism connecting said levers with said bed and running-gears, and enabling an operator to lift said bed into dumping position.

In testimony that I claim the foregoing as my invention I have signed my name, in presence of two witnesses, this 22d day of November, 1902.

JOSEPH GRUNDLER.

Witnesses:
  B. PATTERSON,
  S. M. STONE.